INVENTORS.
Harold F. Silver,
Clarence R. Steele,
Frank B. Price,

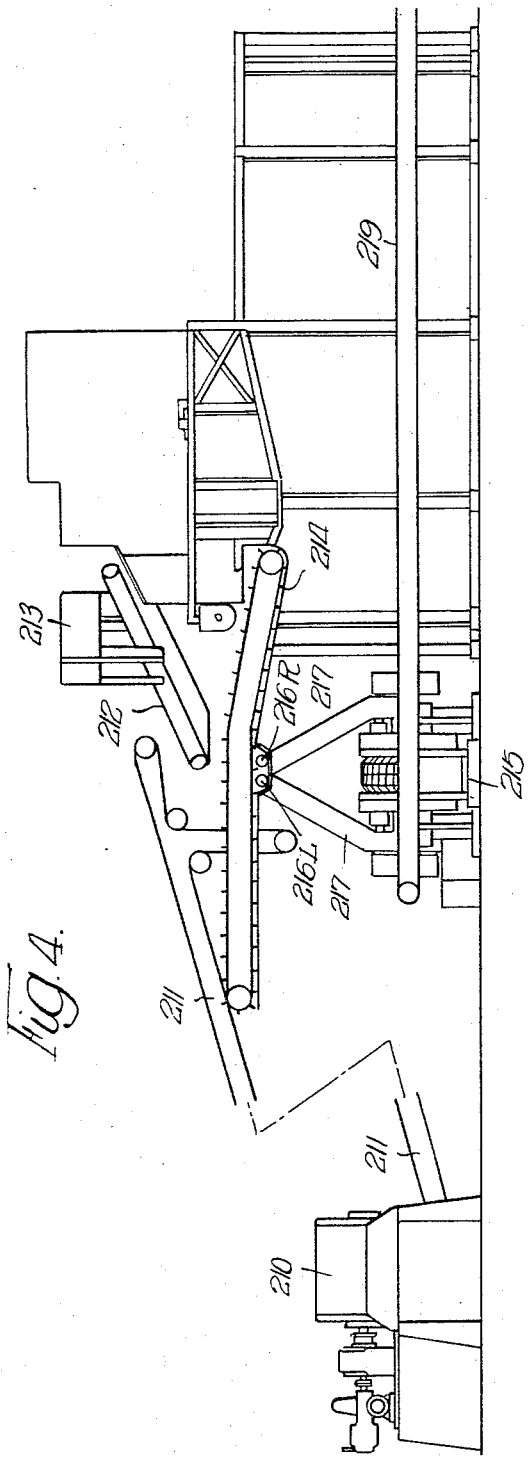

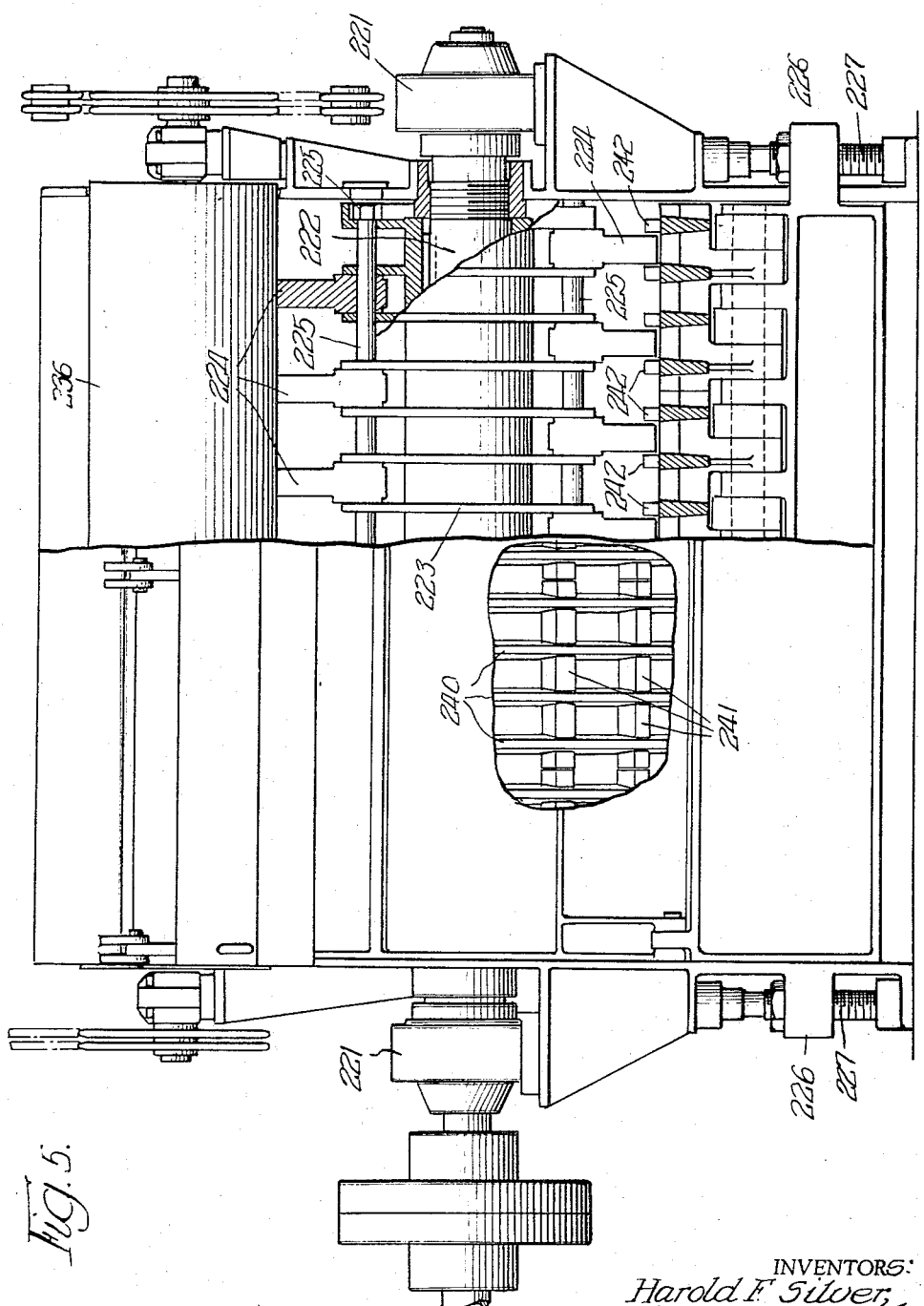

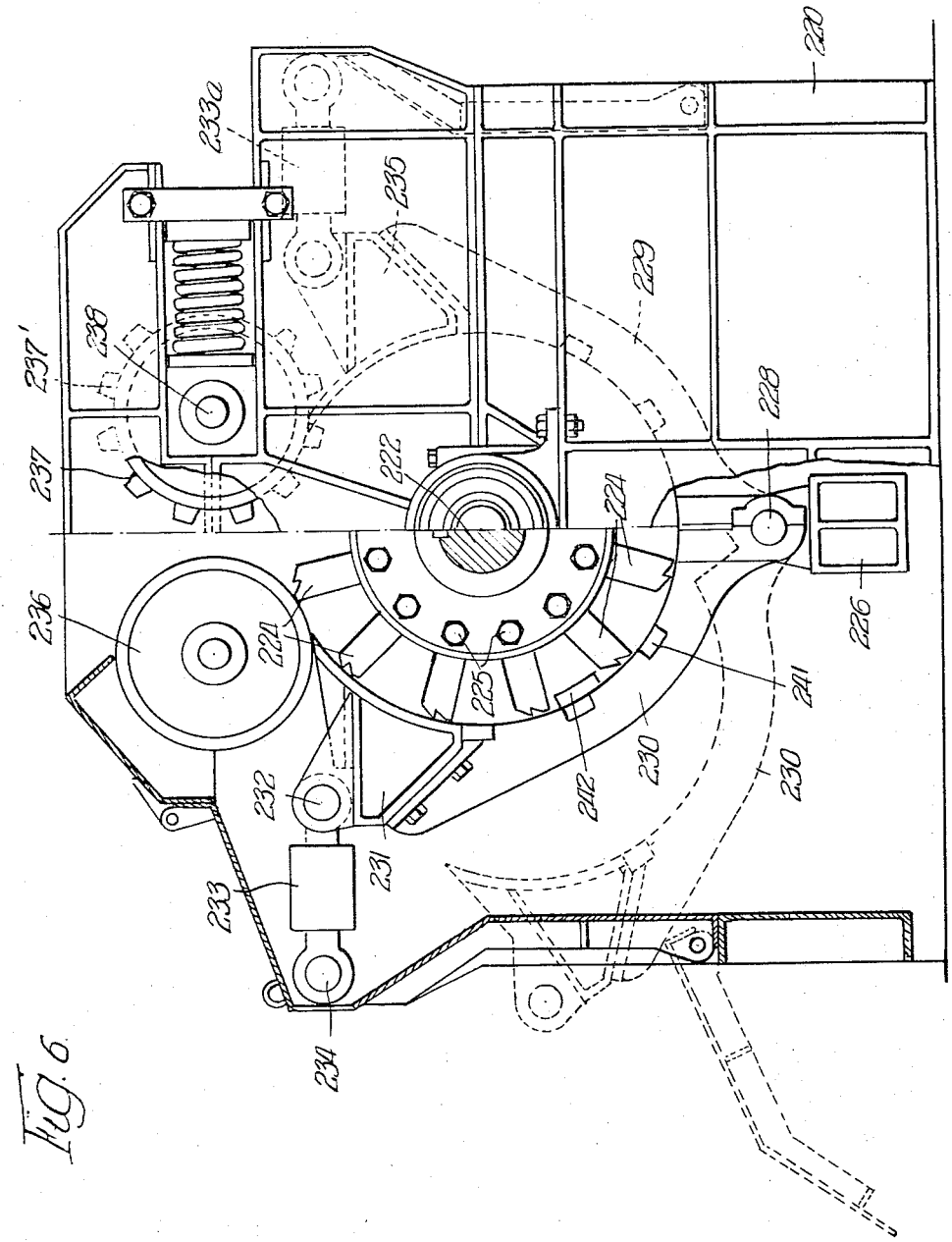

United States Patent Office 3,370,797
Patented Feb. 27, 1968

1

3,370,797
APPARATUS FOR BREAKING SUGAR CANE
AND THE LIKE
Harold F. Silver, Clarence R. Steele, and Frank B. Price, Denver, Colo., assignors to American Factors Associates, Limited, Honolulu, Hawaii, a corporation of Delaware
Original application Nov. 14, 1962, Ser. No. 237,575, now Patent No. 3,248,263. Divided and this application Mar. 4, 1966, Ser. No. 531,671
9 Claims. (Cl. 241—186)

This application is a division of applicants' copending application Ser. No. 237,575, filed Nov. 14, 1962, and entitled "Solvent Extraction Process," now Patent No. 3,248,263. According to that process, solid materials such as sugar cane should be subdivided to a size and consistency such as will provide a permeable mass in the diffuser which will lend itself to the diffusion activity described and claimed in said application.

When sugar cane is treated for the removal of sugar by diffusion as described in said application, the cane is preferably prepared for such treatment by subjecting it to the action of an apparatus referred to in said application as a "cane buster," and thereafter to the action of a "cane fiberizer." This invention relates to a new and improved cane buster which is especially adapted for use in a cane diffusion system of the type above referred to, and as described and claimed in said copending application.

It is an object of this invention to provide a new and improved apparatus for breaking cane in order to prepare it for the cane fiberizing mechanism above referred to and described and claimed in copending application Ser. No. 489,009, filed Sept. 21, 1965, as a continuation-in-part of the above-identified application Ser. No. 237,575.

A further object of this invention is to provide a new and improved construction for such cane breaking apparatus.

Other objects and advantages of this invention will be apparent to one skilled in this art as the following description proceeds. As illustrative of the invention, reference will now be made to the particular form thereof shown in the accompanying drawings in which:

FIGURE 1 is a plan view of a system incorporating a diffusing, leaching, or lixiviating mechanism of the type described in said copending application Ser. No. 237,575 which is especially adapted for processing sugar cane, and which incorporates, in addition to the extracting mechanism, a cane buster and a cane fiberizer for preparing the cane from the field preparatory to its introduction into the diffusing mechanism;

FIGURE 4 is a side elevational view taken on the line 4—4 of FIGURE 1 and looking in the direction of the arrows;

FIGURE 5 is a side elevational view of the cane processing mechanism constructed in accordance with this invention herein referred to as a cane buster, partly in cross-section to show the disposition of the hammers and with the covering wall removed from a portion of the figure to disclosed the anvil construction; and FIGURE 6 is an end elevational view of the cane buster illustrated in FIGURE 5, partly in cross-section and with a portion of the end frame removed.

Figure 1:
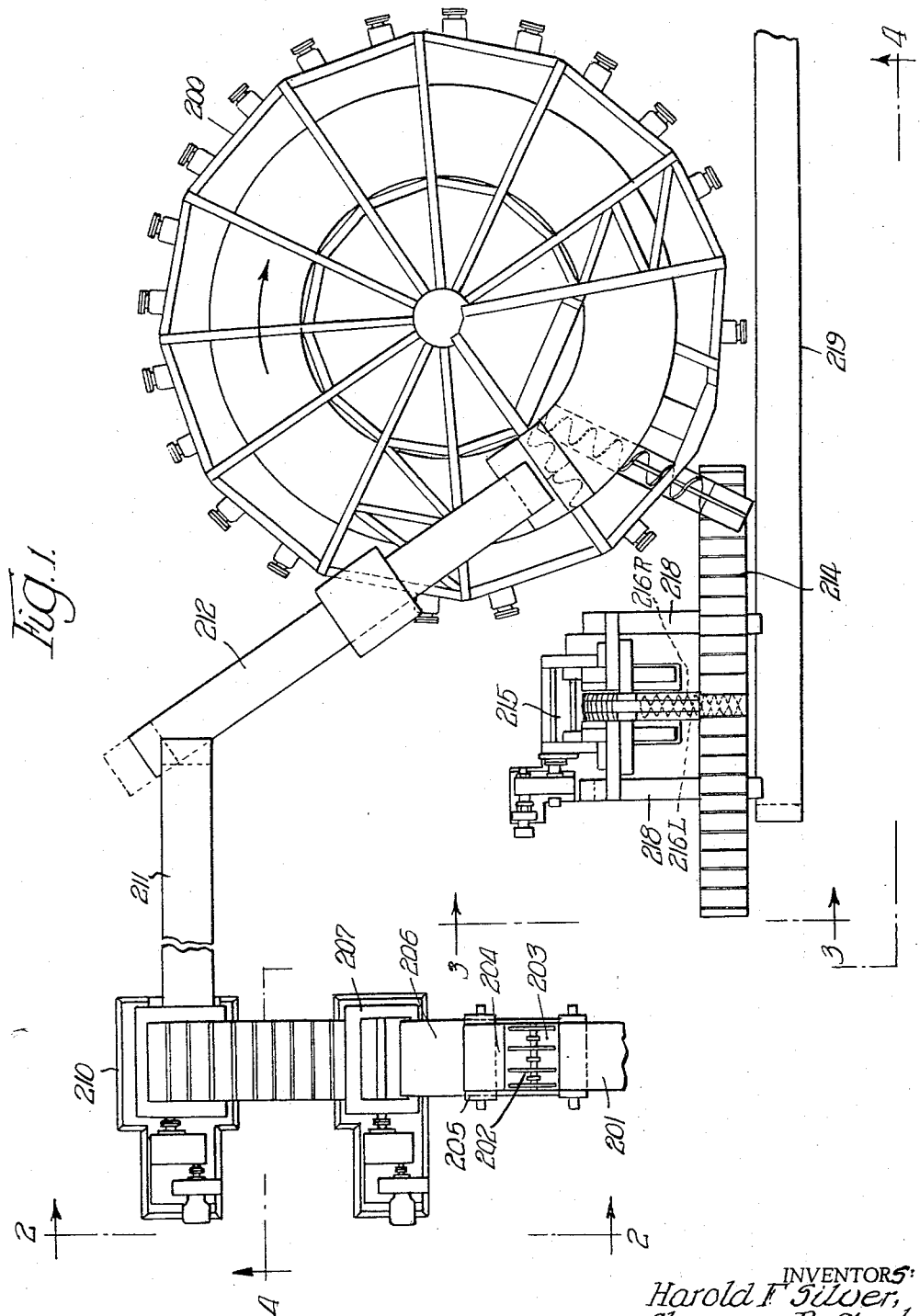
Figure 2:
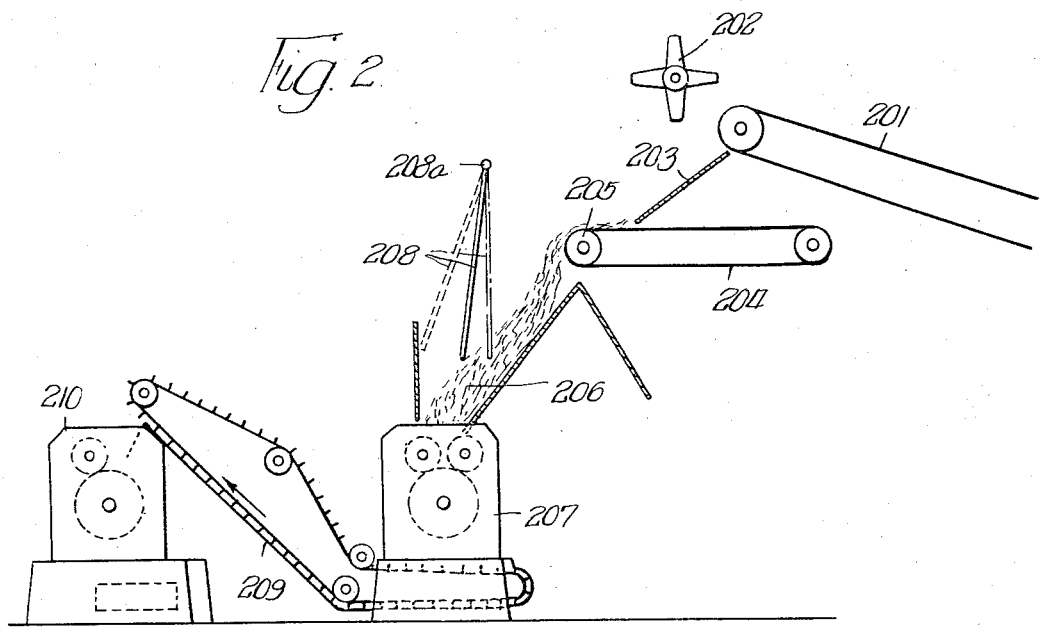
FIGURE 2 is a side elevational view taken on the line 2—2 of FIGURE 1 and looking in the direction of the arrows.
Figure 3:
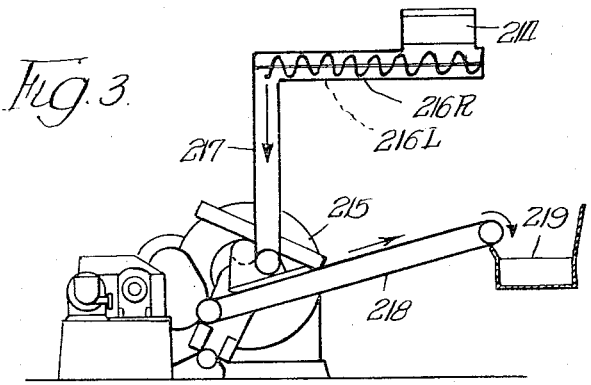
FIGURE 3 is an elevational view taken on the line 3—3 of FIGURE 1 and looking in the direction of the arrows.

Referring now to FIGURES 1 to 4, inclusive, it will be noted that the system illustrated comprises a diffuser 200, a cane buster 207, and a cane fiberizer 210, the cane buster of which constitutes the subject of this invention.

In operating a system of this type, the cane from the field, with or without previous cleaning, is initially introduced to the system on a moving cane carrier conveyor 201, which presents the cane to rotary cane knives 202, which cut the cane into sizes producing a handleable mass. The cane so cut moves across the plate 203 and is advanced by the belt 204 over a magnetic pulley 205 which serves to remove any tramp iron. The cane is then fed into a hopper 206 above the cane buster 207. Preferably a sensing plate 208 is employed, mounted on a pivot 208a, so that it may be displaced in a manner representative of the quantity of cane being held at any one time in the hopper. The apparatus is so constructed that the angular position of the sensing plate is connected to control the speed of the cane carrier conveyor, with the result that the desired amount of cane is at all times available to the cane buster. The can buster further reduces the size of the pieces of knifed cane and produces therefrom a mass of cane in the proper form to be presented to the cane fiberizer. The cane so reduced in the buster is carried by a conveyor 209 outwardly from the bottom of the buster and thence upwardly and deposited in the top of the cane fiberizer 210. The construction and operation of the fiberizer is described in greater detail in the aforementioned copending application Ser. No. 489,009. The fiberized cane passes from the fiberizer upwardly on a belt 211 and is deposited on a scale conveyor 212 which serves to convey the fiberized cane to the diffuser 200 and, by suitable mechanism, not shown, to weigh and record continuously the amount of fiber to be processed. The fiberized cane is fed by the scale conveyor 212 to the material feeding scroll of the diffuser. After the fiberized cane is deposited in the diffuser and formed into an elongated mass, it is subjected to a diffusing operation. After being so processed the spent cane or wet bagasse is removed from the diffuser by the scroll and delivered to a conveyor 214 which conveys it to one or more bagasse presses. In the particular embodiment here illustrated only a single bagasse press is shown, but it is to be understood that two or more may be employed, if required, for parallel operation. Accordingly, conveyor 214 is illustrated as extended in order that excess material which cannot be received by the first bagasse press will be moved on to the next press. The bagasse press 215 receives wet bagasse from the conveyor 214. The pressed bagasse is discharged from the press through both sides thereof onto two conveyors 218—218, which are driven to discharge the carried pressed bagasse to a main pressed bagasse conveyor 219, which removes it for disposal. The juice extracted from the wet bagasse is pumped from the press through suitable piping, not shown, back to the diffuser.

The preferred construction of the cane buster comprises a main frame 220, which serves as a mounting for bearings 221—221 at the opposite ends of the machine for accommodating the main rotor shaft 222 mounted therein. This shaft rotatably mounts the rotor designated generally as 223 which has a plurality of hingedly mounted hammers 224 carried on suitable pins 225. Any suitable number of hammers can be employed and the respective locations thereof can be selected in the manner shown in the drawing. Located below the rotor and carried by the frame 220 is a beam support 226 which is mounted for vertical adjustment by means of rotating screws 227—227 or other similar means. The beam support 226 serves as a mounting for hinge pins 228 which hingedly support the two complementary sections 229 and 230 of the anvil members which substantially surround the rotor.

The upper part of anvil member 230 is attached to a beam 231 which has a pivotal connection at 232 with an adjustable turnbuckle 233, which is pivotally mounted at 234 to the housing. The turnbuckle shown is located at one end of the beam 231 and a similar turnbuckle connection is provided at the opposite end of beam 231. Similarly, a pair of turnbuckles 233a of the same construction will be provided on the opposite side of the device connecting the beam 235 to the housing.

It will be noted from this construction that the supporting beam 226 may be adjusted vertically and that the four turnbuckles may be adjusted laterally so as to provide a proper spacial relationship between the anvils, respectively, and the hammers of the rotor. Adjacent the top a feed roller 236 is disposed in spaced relation to a second feed roller 237, one or both of which may have feeding teeth 237' thereon as indicated on roller 237. These feeding teeth 237' are of such height and the feed rollers 236 and 237 are so disposed that the feeding teeth extend into the space between the ends of adjacent hammers. One of the rollers is preferably mounted in a movable spring backed bearing such as illustrated at 238 so as to avoid breakage or damage to the machine in the event of improper feeding.

Each anvil member consists of a plurality of separate sections tied together at their upper ends by the beams 231–235, and held in fixed position at their lower ends on hinge pins 228. Each of these sections has openings therethrough constructed and formed in the manner illustrated in FIGURE 5 as viewed throuh the area where the wall is removed. It will be noted that each of these anvils consists of a plurality of circumferentially extending ribs 240 connected by integral tie bars 241, having a shape generally as shown in FIGURE 6. It will be noted that the ribs are of greater depth than the tie bars and that the assembly as such provides a plurality of rows of openings through the anvil member which taper outwardly and provide passages through which the busted cane may pass. Mounted on each anvil member projecting inside the inner circumference thereof are a plurality of breaker lugs 242 shown in FIGURES 5 and 6. It will be noted that these are so positioned that the ends of the hammers may pass between them in a slightly overlapped relation whereby a breaking action is established between the lugs and the ends of the hammers. Each of the hammers is preferably provided on its outer face with two teeth which produce a better breaking action when the mechanism is utilized for busting cane. In addition the ends of the hammers will exert a shearing action in conjunction with the integral tie bars 241. The overall sizes of the pieces of the cane emerging from the buster will be determined generally by the size of the openings in the anvil members.

One of the important features of the invention is the ready accessibility of the working parts. In the event of damage or the necessity for cleaning, the anvil members can be tilted outwardly to the dotted line position shown in FIGURE 6 so as to give quick and ready access to the rotor for replacement of hammers. As shown, the tilting of the anvil members is effected merely by removing the pins with which each, respectively, is connected to the frame through its associated turnbuckle. In the form here shown, a portion of the side wall, housing the mechanism, is made pivotal to provide space for the anvil members when in dotted line position.

The rotor may be driven from any suitable source of power and is rotated at whatever speed desired. In the case of sugar cane it is preferably operated in the neighborhood of 800 to 1200 r.p.m. It is important, in the operation of this device, to drive the feed rolls 236 and 237 at a controlled rate in order to assure the feeding of the proper amount of cane to the buster.

In operation all of the material fed to the buster passes through the space defined by the two anvil members where it is acted upon by the hammers, respectively, with the result that it is broken and forced radially outwardly through the openings in the anvil members. In view of the fact that the rotor chamber is closed at both ends and the rotor is completely surrounded by the anvil members, except that the upper inlet portion, all of the material fed to the buster passes through the anvil members under the action of centrifugal force generated by the hammers. The location of the feed roller 236, with its periphery in close proximity to the ends of the hammers, serves to enhance the inward feeding of cane to the buster and to offset, in large measure, the tendency of the rotor to reject cane due to its centrifugal force. The material is then collected in the bottom space underlying the anvil members and conveyed to the fiberizer.

The form of this invention herein disclosed is illustrative and is given only by way of example. The scope of the invention is not to be limited thereby as it is intended that the appended claims be construed as broadly as may be permitted by the prior art.

We claim:

1. An apparatus for breaking sugar cane into pieces comprising a rotor having pivoted hammers adjacent the periphery thereof, an associated anvil surrounding said rotor constructed to provide a feeding opening adjacent the top of the apparatus, at least one driven feeding roll mounted adjacent to the top portion of said rotor and above said anvil for supporting the cane entering said feed opening and feeding same to said hammers, said anvil having openings of predetermined size therethrough, through which the broken cane passes, and breaker lugs on the inside of the periphery of said anvil extending inwardly into spaces between the ends of adjacent hammers on said rotor.

2. An apparatus of the construction defined in claim 1 further characterized in that a pair of driven feeding rolls is mounted adjacent the feed opening so as to control the amount of material fed to said apparatus.

3. An apparatus of the construction defined in claim 1 further characterized in that said anvil is made in two complementary hingedly mounted parts.

4. An apparatus of the construction defined in claim 1 further characterized in that said anvil is made in two complementary parts hingedly mounted on a common axis.

5. An apparatus of the construction defined in claim 3 further characterized in that said parts are movable on their axes, respectively, to provide access to said rotor.

6. An apparatus of the construction defined in claim 1 further characterized in that the driven feeding roll has lugs thereon extending between the ends of the hammers.

7. An apparatus of the construction defined in claim 2 further characterized in that the driven feeding rolls have lugs thereon extending between the ends of the hammers.

8. An apparatus for breaking sugar cane into pieces comprising a rotor having pivoted hammers adjacent the periphery thereof, an associated anvil surrounding said rotor constructed to provide a feeding opening adjacent the top of the apparatus, said anvil having openings of predetermined size therethrough, through which the broken cane passes, the breaker lugs on the inside of said anvil extending inwardly into spaces between the ends of adjacent hammers on said rotor, said anvil having two complementary hingedly mounted parts in which each said part is pivotally adjustable toward and away from the other on the axis of its mounting and the axis of each said part is adjustable toward and away from the axis of said rotor, whereby the space between said anvil and said rotor is adjustable.

9. An apparatus for breaking sugar cane into pieces comprising a rotor having pivoted hammers adjacent the periphery thereof, an associated anvil surrounding said rotor constructed to provide a feeding opening adjacent the top of the apparatus, said anvil having openings of predetermined size therethrough, through which the broken cane passes, and breaker lugs on the inside of said anvil extending inwardly into spaces between the ends of adjacent hammers on said rotor, said anvil having two complementary hingedly mounted parts which are pivotally adjustable toward and away from each other on the axis of their mounting and said axis is adjustable toward and away from the axis of said rotor, whereby the space between said anvil and said rotor is adjustable.

(References on following page)

References Cited

UNITED STATES PATENTS

| | | | |
|---|---|---|---|
| 387,438 | 8/1888 | Parker. | |
| 664,852 | 1/1901 | Green | 241—190 XR |
| 1,039,102 | 9/1912 | Cornwall | 241—89 |
| 1,044,401 | 11/1912 | Liggett et al. | 241—192 |
| 1,125,137 | 11/1915 | Liggett | 241—89 |
| 2,148,547 | 2/1939 | Fiese | 241—190 |
| 2,186,651 | 6/1965 | Briolini | 241—186 |
| 2,358,418 | 9/1944 | Rosecky | 241—190 XR |
| 2,946,523 | 7/1960 | Phillips | 241—89 |
| 1,851,390 | 3/1932 | Kehoe | 241—190 |

WILLIAM W. DYER, Jr., *Primary Examiner.*

R. J. ZLOTNIK, *Assistant Examiner.*